(12) United States Patent
Schaff et al.

(10) Patent No.: US 8,249,241 B1
(45) Date of Patent: Aug. 21, 2012

(54) CALL ROUTING THROUGH AN ACCESS NODE SHARED BY MULTIPLE NETWORKS BY USING A DOUBLE-NETWORK IDENTIFIER

(75) Inventors: Jonathan E. Schaff, San Leandro, CA (US); Dominick Mangiardi, Fremont, CA (US); Jared Ames Olson, Olathe, KS (US); Ivan Sheon Fenwick, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 365 days.

(21) Appl. No.: 12/708,602

(22) Filed: Feb. 19, 2010

(51) Int. Cl.
*H04M 7/00* (2006.01)
(52) U.S. Cl. ............... 379/221.02; 379/221.11
(58) Field of Classification Search ............. 379/221.02, 379/221.11
See application file for complete search history.

(56) References Cited

U.S. PATENT DOCUMENTS

| | | | |
|---|---|---|---|
| 5,425,090 A | 6/1995 | Orriss | |
| 6,741,588 B1 | 5/2004 | Stewart | |
| 2003/0086539 A1* | 5/2003 | McCalmont et al. | 379/45 |
| 2004/0228466 A1* | 11/2004 | Bedingfield et al. | 379/221.01 |
| 2006/0111094 A1* | 5/2006 | Lee | 455/418 |
| 2007/0291921 A1* | 12/2007 | Fleischer et al. | 379/229 |

* cited by examiner

*Primary Examiner* — Creighton Smith

(57) ABSTRACT

In a communication network, a call processing system receives signaling for a call indicating a called number. The system processes the called number to determine a single-network identifier associated with the called number. The system processes the single-network identifier to determine if the single-network identifier identifies an affiliated network that is affiliated with the communication network. If the single-network identifier identifies the affiliated network, then the system selects a double-network identifier indicating both the communication network and the affiliated network. The system transfers response signaling that includes the double-network identifier.

20 Claims, 7 Drawing Sheets

CALL ROUTING THROUGH AN ACCESS NODE SHARED BY MULTIPLE NETWORKS BY USING A DOUBLE-NETWORK IDENTIFIER

TECHNICAL BACKGROUND

Various communication networks own and control special service telephony numbers, such as "800" type numbers. The communication networks lease the special service numbers to various telephony service customers, such as retail businesses and government entities. On calls placed to the special service numbers, the communication networks translate the numbers into routable telephony numbers using various criteria, such as caller number, time-of-day, customer routing plans, and the like.

These communication networks are individually identified by Carrier Identification Codes (CICs). On many special service calls, the network receiving the call (the originating network) translates the special service number into the CIC for the network that owns the special service number (the owning network). The originating network then routes the call to the owning network based on this CIC. The owning network translates the special service number into a telephone number and processes the telephone number to route the call to the customer who has leased the special service number.

Communication networks also share access nodes. For example, two networks may share a switching system that serves the customers of both networks. These customers often lease special service numbers from the communication networks as well. Thus, the shared access node typically handles a large amount of special service calls.

Overview

In a communication network, a call processing system receives signaling for a call indicating a called number. The system processes the called number to determine a single-network identifier associated with the called number. The system processes the single-network identifier to determine if the single-network identifier identifies another network that is affiliated with the communication network. If the single-network identifier identifies an affiliated network, then the system selects a double-network identifier indicating both the communication network and the affiliated network. The system then transfers response signaling that includes the double-network identifier. In some examples, the communication network routes the call to a shared access node based on the double-network identifier, and the double-network identifier creates a record of the two networks associated with the call, even though the call physically bypasses the affiliated network.

DETAILED DESCRIPTION

Figure 1:
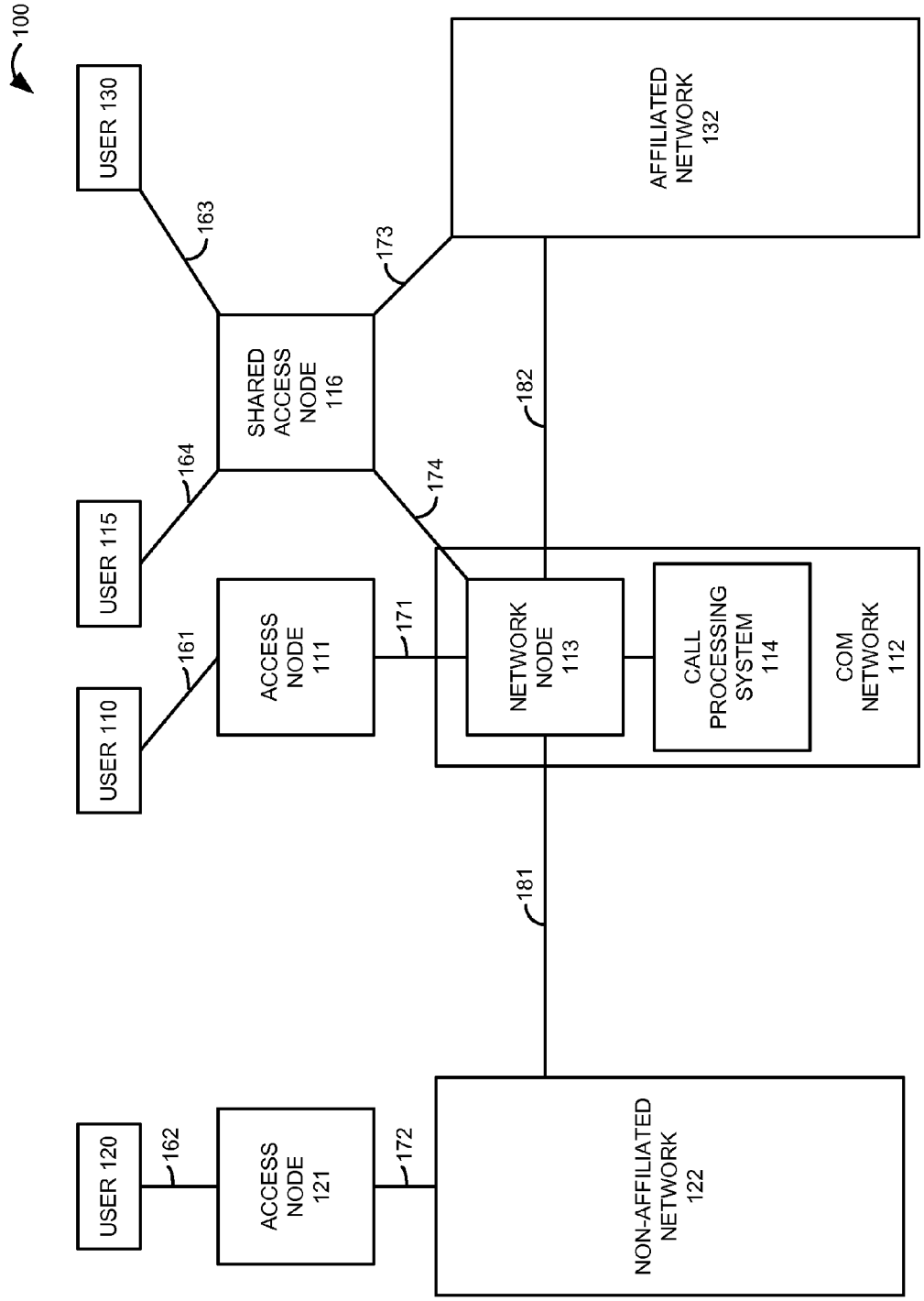
FIG. 1 illustrates a communication network that uses a double-network identifier to route calls through an access node shared by multiple networks.

FIG. 1 illustrates communication network 112 that uses a double-network identifier to route calls through shared access node 116. Shared access node 116 is shared by communication network 112 and affiliated network 132. The affiliation is formed by an arrangement between networks 112 and 132 to share access node 116. In some examples, shared access node 116 is hosted by a third party on behalf of networks 112 and 132.

Communication network 112 comprises network node 113 and call processing system 114. Network node 113 and access node 111 communicate over communication link 171. Access node 111 and user 110 communicate over access link 161. Network node 113 and shared access node 116 communicate over communication link 174. Shared access node 116 and user 115 communicate over access link 164. Network node 113 and affiliated network 132 communicate over expensive network link 182. Affiliated network 132 and shared access node 116 communicate over communication link 173. Shared access node 116 and user 130 communicate over access link 163. Network node 113 and non-affiliated network 122 communicate over expensive network link 181. Non-affiliated network 122 and access node 121 communicate over communication link 172. Access node 121 and user 120 communicate over access link 162.

Figure 2:
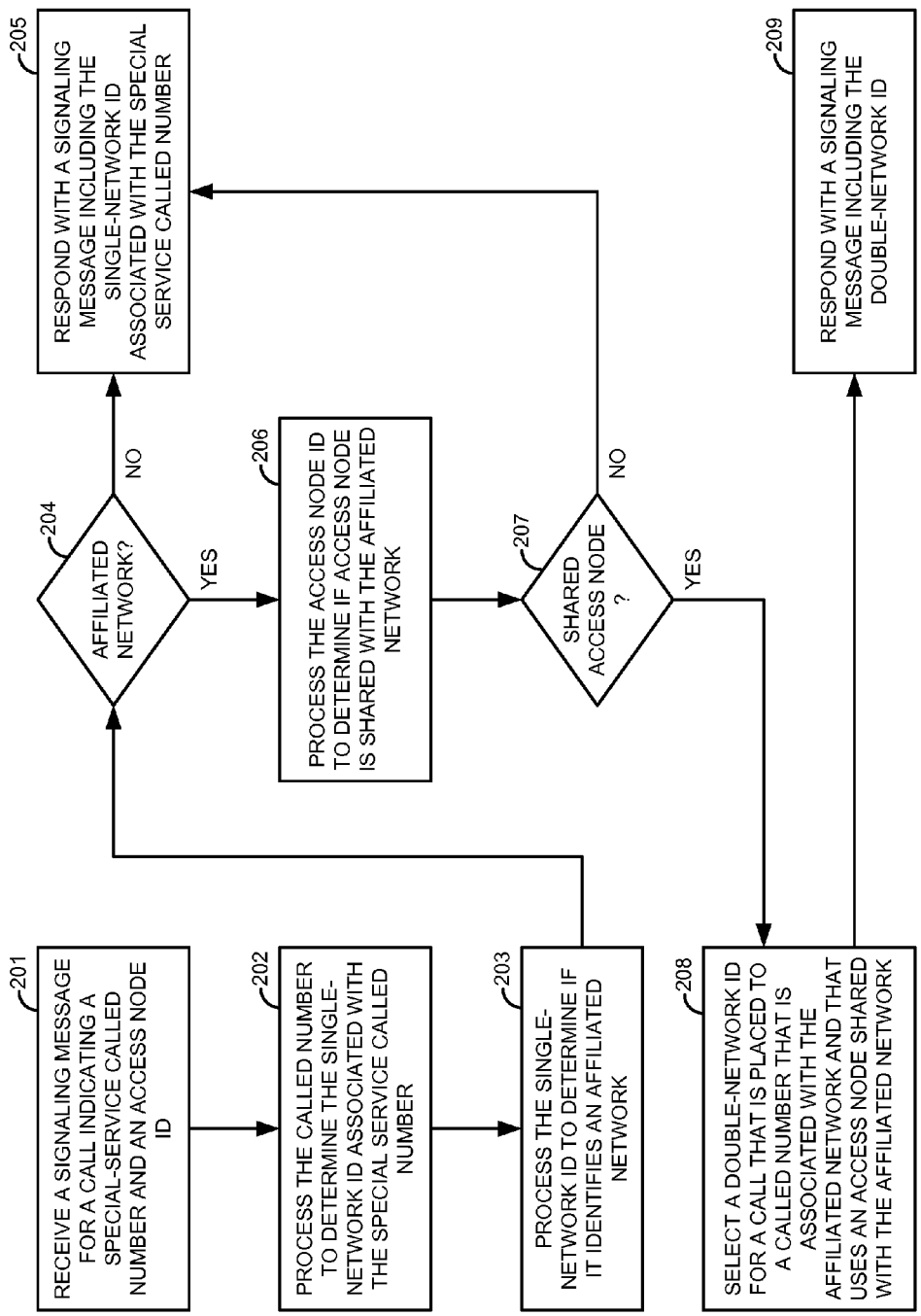
FIG. 2 illustrates the operation of a call processing system to select a double-network identifier to route calls through an access node shared by multiple networks.

FIG. 2 illustrates the operation of call processing system 114 to select a double-network identifier to route calls through shared access node 116. Call processing system 114 receives a query signaling message for a call indicating a special service called number and an access node identifier (201). The special service called number could be an "800" type number for a toll-free service or some other special number for some other special service. The access node identifier indicates which one of access nodes 111, 116, or 121 that interacted with the caller system to originate the call. Call processing system 114 processes the called number to determine a single-network identifier that is associated with the called number (202). The single-network identifier indicates only one communication network, with one example being a Carrier Identification Code (CIC). For example, the special service called number could be an "800" number that is owned by affiliated network 132, and thus, this "800" number is associated with the CIC for affiliated network 132.

Call processing system 114 processes the single-network identifier to determine if the single-network identifier identifies an affiliated network, such as affiliated network 132 (203). If the single-network identifier does not identify an affiliated network (204), then the call processing system 114 transfers a response signaling message that includes the single-network identifier associated with the called number (205). The response signaling message may include other data, such as a translation of the special service called number.

If the single-network identifier identifies an affiliated network, such as affiliated network 132 (204), then call processing system 114 processes the access node identifier to determine if the access node identifier identifies a shared access node, such as shared access node 116 (206). If the access node identifier does not identify a shared access node (207), then call processing system 114 transfers a response signaling message that includes the single-network identifier associated with the called number (and possibly a called number translation). If the access node identifier identifies a shared access node, such as shared access node 116 (207), then call processing system 114 selects a double-network identifier (208). The double-network identifier is associated with two networks—communication network 112 and the affiliated network—instead of being associated with only the affiliated network.

Various techniques could be used to perform step 206. In one example, the called special service number could be checked against a list of special service numbers for affiliated network 132 that terminate through shared access node 116. This list could also include a called number translation to a routing number that directs network node 113 to route the call to shared access node 116. In another example, the access node identifier for the call could be checked against the identifier for shared access node 116 which could also yield the called number translation.

In some alternative embodiments, steps 206-207 are omitted. In these alternative embodiments, call processing system 114 selects the double-network identifier (208) if the single-network identifier identifies affiliated network 132 (204) without the need for the call to originate through a shared access node.

In either case, call processing system 114 transfers a response signaling message that includes the double-network identifier that indicates two communication networks (209). One example of a double-network identifier is a special Carrier Identification Code (CIC). For example, communication network 112 typically has multiple different CICs. Communication network 112 could allocate one of these CICs to be a special CIC that represents both communication network 112 and affiliated network 132. Thus, this special CIC is a double-network identifier for networks 112 and 132.

Figure 3:
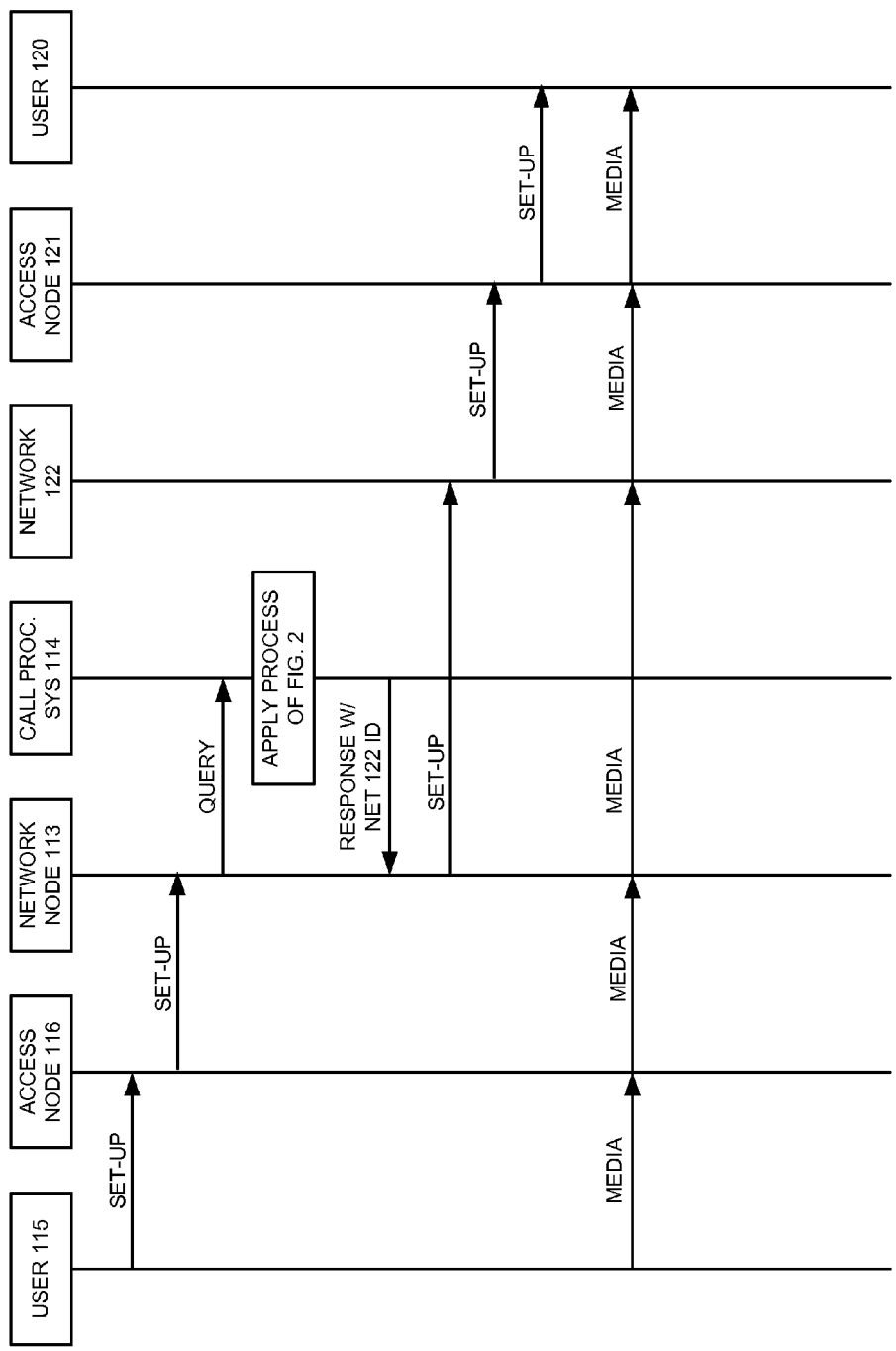
FIG. 3 illustrates the operation of a communication network to use a double-network identifier to route calls through an access node shared by multiple networks.

FIG. 3 illustrates the operation of communication network 112 for a special service call from user 115 to user 120 using a special service called number that is owned by non-affiliated network 122. To place the call, user 115 transfers set-up signaling to shared access node 116 that indicates the special service called number. Based on the special service called number, shared access node 116 transfers set-up signaling to network node 113 that indicates the special service called number and an access node identifier that identifies shared access node 116. Based on the special service called number, network node 113 queries call processing system 114 with signaling that indicates the special service called number and the access node identifier.

Call processing system 114 applies the process of FIG. 2 (typically in addition to other call processing). Thus, call processing system 114 processes the called number to yield the network identifier for non-affiliated network 122, and since the network identifier is for a non-affiliated network, call processing system 114 responds to network node 113 with the single-network identifier for non-affiliated network 122. In response to the single-network identifier for network 122, network node 113 transfers set-up signaling to non-affiliated network 122.

Non-affiliated network 122 transfers set-up signaling to access node 121, and access node 121 transfers set-up signaling to user 120. The media for the call takes the following path: user 115-access node 116-network node 113-non-affiliated network 122-access node 121-user 120. Note that the media is transferred to non-affiliated network 122 over expensive network link 181.

Figure 4:
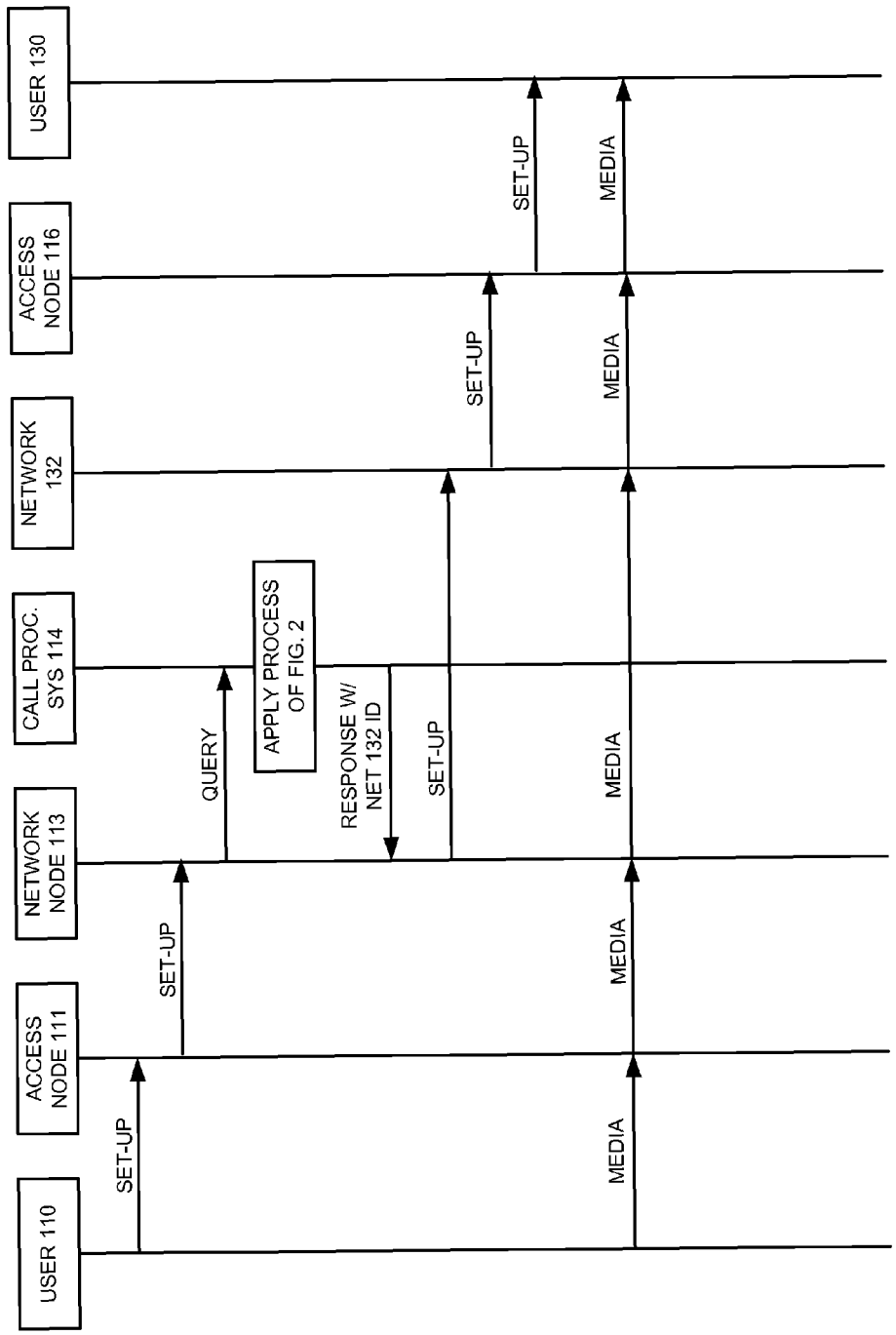
FIG. 4 illustrates the operation of a communication network to use a double-network identifier to route calls through an access node shared by multiple networks.

FIG. 4 illustrates the operation of communication network 112 for a special service call from user 110 to user 130 using a special service called number that is owned and controlled by affiliated network 132. To place the call, user 110 transfers set-up signaling to access node 111 that indicates the special service called number. Based on the special service called number, access node 111 transfers set-up signaling to network node 113 that indicates the special service called number and an access node identifier that identifies access node 111. Based on the special service called number, network node 113 queries call processing system 114 with signaling that indicates the special service called number and the access node identifier.

Call processing system 114 applies the process of FIG. 2 (typically in addition to other call processing). Thus, call processing system 114 processes the called number to yield the network identifier for affiliated network 132. Since the network identifier is for an affiliated network, call processing system 114 processes the access node identifier to determine if the access node is shared. Since access node 111 is not shared, call processing system responds to network node 113 with the single-network identifier for affiliated network 132. In response to the single-network identifier for affiliated network 132, network node 113 transfers set-up signaling to affiliated network 132.

Affiliated network 132 transfers set-up signaling to access node 116, and access node 116 transfers set-up signaling to user 130. The media for the call takes the following path: user 110-access node 111-network node 113-affiliated network 132-access node 116-user 130. Note that the media is transferred to affiliated network 132 over expensive network link 182.

In the alternative embodiment discussed above for FIG. 2, the result would be different because the assessment of a shared access node would be omitted. Thus, call processing system 114 would select a double network identifier for networks 112 and 132 since the special service number is associated with affiliated network 132. Call processing system 114 would responds to network node 113 with the double-network identifier, and in response to the double-network identifier, network node 113 transfers set-up signaling to shared access node 116. Shared access node 116 transfers set-up signaling to user 130. The media for the call would take the following path: user 110-access node 111-network node 113-shared access node 116-user 130.

Figure 5:
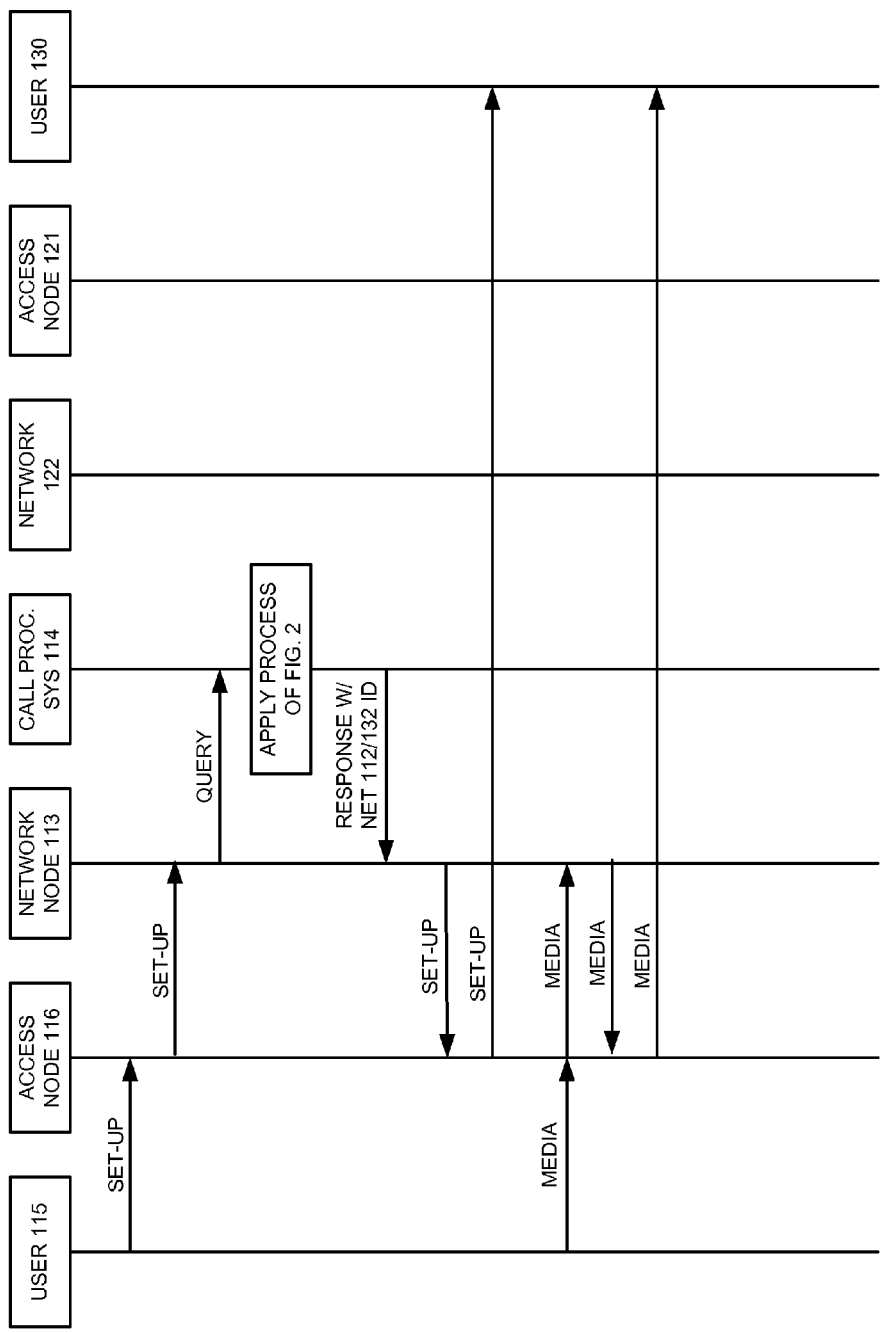
FIG. 5 illustrates the operation of a communication network to use a double-network identifier to route calls through an access node shared by multiple networks.

FIG. 5 illustrates the operation of communication network 112 for a call from user 115 to user 130 using a special service called number that is owned and controlled by affiliated network 132. To place the call, user 115 transfers set-up signaling to shared access node 116 that indicates the special service called number. Based on the special service called number, shared access node 116 transfers set-up signaling to network node 113 that indicates the special service called number and an access node identifier that identifies shared access node 116. Based on the special service called number, network node 113 queries call processing system 114 with signaling that indicates the special service called number and the access node identifier.

Call processing system 114 applies the process of FIG. 2 (typically in addition to other call processing). Thus, call processing system 114 processes the called number to yield the network identifier for affiliated network 132. Since the network identifier indicates an affiliated network, call processing system 114 processes the access node identifier to determine if the access node is shared. Since access node 116 is shared, call processing system 114 selects a double network identifier for networks 112 and 132. Call processing system 114 responds to network node 113 with the double-network identifier, and in response to the double-network identifier, network node 113 transfers set-up signaling to shared access node 116. Shared access node 116 transfers set-up signaling to user 130. The media for the call takes the following path: user 115-shared access node 116-network node 113-shared access node 116-user 130.

Note that the media is not transferred over expensive network links 181-182. Advantageously, the double-network identifier routes the call from network node 113 back to shared access node 116 to avoid the use of expensive network links 181-182. Also note that the double-network identifier creates a record to subsequently associate the call with affiliated network 132, even though affiliated network 132 was physically bypassed on the call. For example, network node 113 could generate a billing record for the call that includes the double-network identifier.

Figure 6:
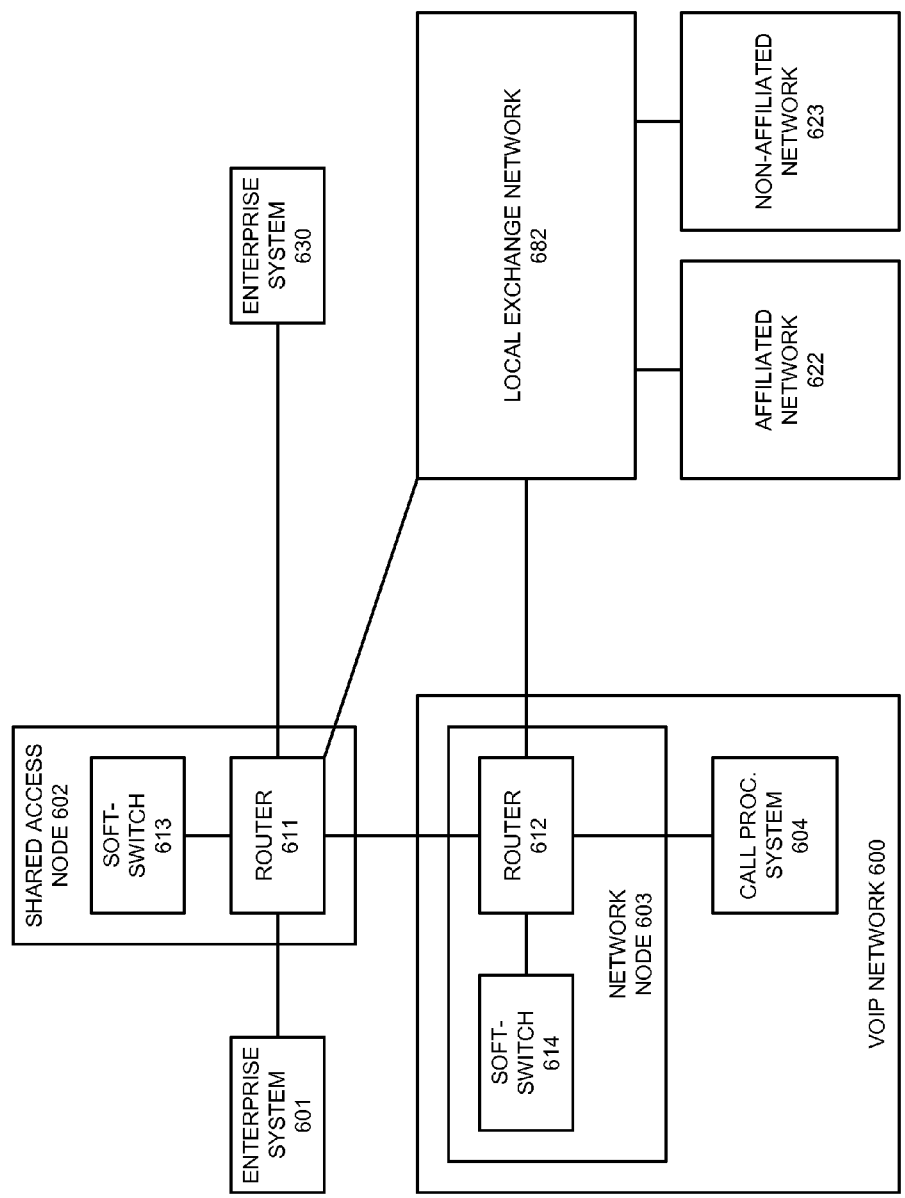
FIG. 6 illustrates a Voice over Internet Protocol (VOIP) network that uses a double-network identifier to route calls through an access node shared by multiple networks.

FIG. 6 illustrates Voice over Internet Protocol (VOIP) network 600 that uses a double-network identifier to route calls through shared access node 602. VOIP network 600 is an example of communication network 112, although network 112 could use alternative configurations. VOIP network 600 comprises network node 603 and call processing system 604. Call processing system 604 could be a service control point, an application server, or some other network control system. Network node 603 comprises soft-switch 614 and router 612.

Network node 603 communicates with shared access node 602. Shared access node 602 comprises router 611 and soft-switch 613. Shared access node communicates with enterprise systems 601 and 630. Network node 603 also communicates with affiliated network 622 and non-affiliated network 623 over local exchange network 682. Note that communications through local exchange network 682 are expensive.

Consider an example where enterprise system 630 has leased a special service number from affiliated network 622, and where enterprise system 601 calls enterprise system 630 using the special service number. Enterprise system 601 transfers a Session Initiation Protocol (SIP) Invite message to soft-switch 613 including the special service number for enterprise system 630. Soft-switch 613 processes the special service number to transfer a SIP Invite message to soft-switch 614 including the special service number for enterprise system 630 and the originating node ID for shared access node 602. Soft-switch 614 processes the special service number to transfer a SIP query message to call processing system 604 including the special service number for enterprise system 630 and the node ID for shared access node 602.

Call processing system 604 translates the special service number into a routable telephone number—possibly with standard 800 routing logic. Call processing system 604 also processes the special service called number to identify the Carrier Identification Code (CIC) for affiliated network 622 that owns and leases the special service number to enterprise system 630. Call processing system 604 processes the CIC to determine if it indicates an affiliated network, and in since it does, system 604 selects a special CIC that represents both affiliated network 622 and VOIP network 600. Thus, the special CIC is a double-network identifier. Call processing system 604 transfers a SIP response message back to soft-switch 614 indicating the special CIC and the routable telephone number.

Based on the special CIC, soft-switch 614 transfers a SIP Invite message to soft-switch 613 indicating the special CIC and the routable telephone number. Thus, the special CIC directs soft-switch 614 to route the call to soft-switch 613 in shared access node 602 (instead of routing the call to affiliated network 622 over expensive network 682). Soft-switch 613 processes the routable telephone number to route the call to enterprise system 630. Note that the use of expensive local exchange network 682 was avoided. Also note that the special CIC creates a record to associate the call with affiliated network 622, even though affiliated network 622 was physically bypassed on the call.

Consider another example where enterprise system 630 has leased a special service number from non-affiliated network 623, and where enterprise system 601 calls enterprise system 630 using the special service number. Enterprise system 601 transfers a SIP Invite message to soft-switch 613 including the special service number for enterprise system 630. Soft-switch 613 processes the special service number to transfer a SIP Invite message to soft-switch 614 including the special service number for enterprise system 630 and the originating node ID for shared access node 602. Soft-switch 614 processes the special service number to transfer a SIP query message to call processing system 604 including the special service number for enterprise system 630 and the node ID for shared access node 602.

Call processing system 604 translates the special service called number into a routable telephone number—possibly with standard 800 routing logic. Call processing system 604 also processes the special service called number to identify the CIC for non-affiliated network 623 that owns and leases the special service number to enterprise system 630 in this example. Call processing system 604 processes the CIC to determine if it indicates an affiliated network, and in since it does not, call processing system 604 transfers a SIP response message back to soft-switch 614 indicating the standard CIC for non-affiliated network 623 and the routable telephone number.

Based on the standard CIC, soft-switch 614 transfers a SIP Invite message to non-affiliated network 623 over local exchange network 682. Thus, the standard CIC results in soft-switch 614 routing the call to non-affiliated network 623. Non-affiliated network 623 processes the routable telephone number to route the call to shared access node 602 over local exchange network 682. Shared access node 602 processes the routable telephone number to route the call to enterprise system 630. Note that expensive local exchange network 622 was used twice in this example.

In the above examples for FIG. 6, call processing system 604 did not assess whether or not the call originated through a shared access node. In alternative examples, call processing system 604 could assess whether or not the call originated through a shared access node. Thus, if the call originates through a shared access node and if the called number is associated with an affiliated network, then the special CIC (a double-network identifier) would be used in those examples.

Figure 7:
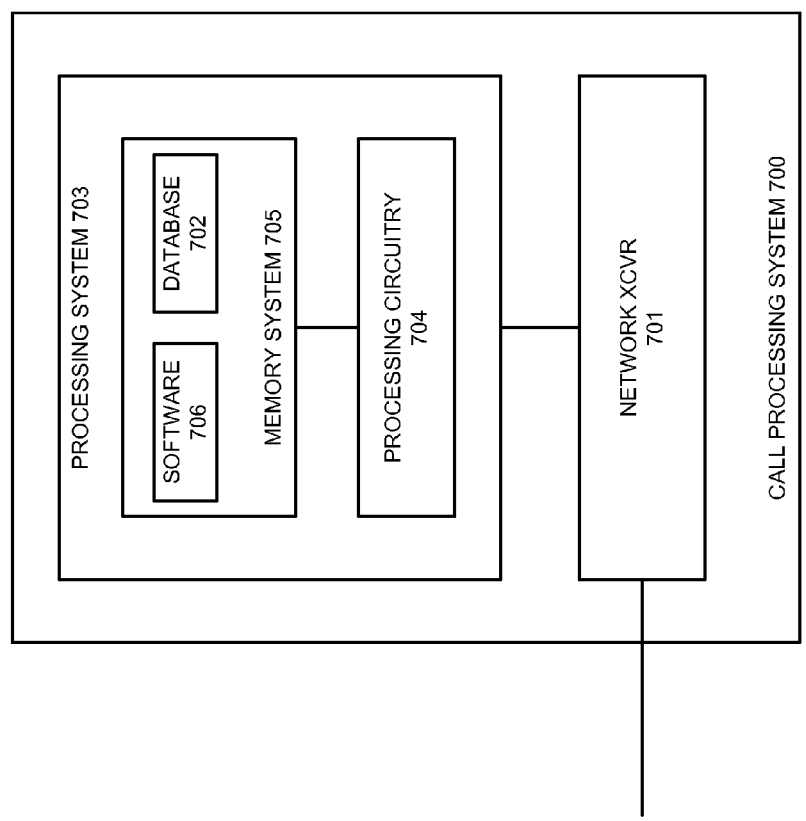
FIG. 7 illustrates a call processing system that uses a double-network identifier to route calls through an access node shared by multiple networks.

FIG. 7 illustrates call processing system 700 that selects a double-network identifier to route calls through an access node shared by multiple networks. Call processing system 700 is an example of call processing systems 114 and 604, although systems 114 and 604 may use alternative configurations. Call processing system 700 could be a discrete system, a distributed system, and/or could be integrated into other systems, such as in the soft-switches. Call processing system 700 comprises network transceiver 701 and processing system 703. Processing system 703 comprises processing circuitry 704 and memory system 705 that stores operating software 706 and database 702. Processing system 703 is linked to transceiver 701. Call processing system 700 may include other well-known components that are not shown for clarity, such as routers, servers, computer systems, databases, and power systems.

Network transceiver 701 comprises a physical communication port, signal processing circuitry, software, and/or some other communication components. Network transceiver 701 may use various protocols, such as IP, TDM, Ethernet, wireless, or some other network communication format—including combinations thereof. Network transceivers 701 exchanges signaling and other control data with communication nodes as described herein.

Processing circuitry 704 comprises microprocessor and other circuitry that retrieves and executes operating software 706 from memory system 705. Memory system 705 comprises a computer-readable storage medium, such as a disk drive, flash drive, data storage circuitry, or some other memory apparatus. Memory system 705 could be a single device or be distributed across multiple devices. Processing circuitry 704 is typically mounted on one or more circuit boards that may also hold memory system 705 and portions of transceiver 701.

Database 702 comprises data structures that associate special service called numbers with their corresponding network identifiers of the owning/controlling networks. The data structures also classify these network identifiers as being affiliated or non-affiliated based on the affiliation status of their corresponding networks. The data structures may also classify node identifiers as being shared or non-shared based on the status of their corresponding nodes. In addition, the data structures may include special service number translations to yield routable telephone numbers.

Operating software 706 comprises computer programs, firmware, or some other form of computer-readable processing instructions. Operating software 706 may include an operating system, utilities, drivers, network interfaces, applications, or some other type of software. When executed by processing circuitry 704, operating software 706 directs processing system 703 to operate call processing system 700 as described herein for network systems 114 and 604. In particular, call processing system 700 determines if a double-network identifier should be used to route select calls through a shared access node.

Referring back to FIG. 1, users 110, 115, 120, and 130 comprise communication devices, such as telephones, computers, digital appliances, and the like. Nodes 111, 113, 116, and 121 and networks 122 and 132 comprise communication equipment, such as switches, routers, gateways, and the like. Call processing system 114 comprises a service control point, application server, computer system, and the like.

Links 161-164, 171-174, and 181-182 use metal, glass, air, space, or some other material as the transport media. Links 161-164, 171-174, and 181-182 use may use various communication formats, such as TDM, IP, Ethernet, wireless, SONET, WDM, or some other communication format—including combinations thereof. Links 161-164, 171-174, and 181-182 may support various communication protocols, such as SIP, SS7, RTP, T1, or some other communication protocol—including combinations thereof. Links 161-164, 171-174, and 181-182 may be direct links or they may traverse a combination of links, networks, systems, and devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication network, the method comprising:
    in a call processing system, receiving a query signaling message for a call indicating a called number;
    processing the called number to determine a single-network identifier associated with the called number;
    processing the single-network identifier to determine if the single-network identifier identifies an affiliated network that is affiliated with the communication network, and if the single-network identifier identifies the affiliated network, then selecting a double-network identifier indicating both the communication network and the affiliated network; and
    transferring a response signaling message that includes the double-network identifier.

2. The method of claim 1 further comprising, in a network node, receiving and processing the response signaling message that includes the double-network identifier, and in response to the double-network identifier, routing the call from the network node to a shared access node.

3. The method of claim 1 wherein the query signaling message indicates an access node identifier and further comprising, in the call processing system, processing the access node identifier to determine if the access node identifier identifies a shared access node that is shared by the communication network and the affiliated network, and wherein selecting the double-network identifier comprises selecting the double-network identifier if the access node identifier identifies the shared access node.

4. The method of claim 3 further comprising, if the access node identifier does not identify the shared access node, then in the call processing system, transferring a different response signaling message that includes the single-network identifier associated with the called number.

5. The method of claim 4 further comprising, in the network node, receiving and processing the different response signaling message that includes the single-network identifier, and in response to the single-network identifier, routing the call to the affiliated network.

6. The method of claim 1 further comprising, if the single-network identifier does not identify the affiliated network, then in the call processing system, transferring a different response signaling message that includes the single-network identifier associated with the called number.

7. The method of claim 6 further comprising, in the network node, receiving and processing the different response signaling message that includes the single-network identifier, and in response to the single-network identifier, routing the call to another communication network identified by the single-network identifier.

8. The method of claim 1 wherein the called number comprises a toll-free number controlled by the affiliated network.

9. A method of operating a communication network comprising:
    in a network node, receiving a call set-up signaling message indicating a called number and processing the called number to determine that additional routing information is needed, and in response, transferring a query signaling message indicating the called number and an access node identifier;
    in a call processing system, receiving the query signaling message and processing the called number to determine a single-network identifier associated with the called number, and processing the single-network identifier to determine if the single-network identifier identifies an affiliated network that is affiliated with the communication network;

if the single-network identifier identifies the affiliated network, then in the call processing system, processing the access node identifier to determine if the access node identifier identifies a shared access node that is shared by the communication network and the affiliated network;

if the access node identifier identifies the shared access node, then in the call processing system, selecting a double-network identifier indicating both the communication network and the affiliated network, and transferring a response signaling message that includes the double-network identifier; and in the network node, receiving and processing the response signaling message that includes the double-network identifier, and in response to the double-network identifier, routing the call to the shared access node.

10. The method of claim 9 further comprising, if the single-network identifier does not identify the affiliated network, then in the call processing system, transferring a different response signaling message that includes the single-network identifier associated with the called number.

11. The method of claim 10 further comprising, in the network node, receiving and processing the different response signaling message that includes the single-network identifier, and in response to the single-network identifier, routing the call to another communication network identified by the single-network identifier.

12. The method of claim 9 further comprising, if the access node identifier does not identify the shared access node, then in the call processing system, transferring a different response signaling message that includes the single-network identifier associated with the called number.

13. The method of claim 12 further comprising, in the network node, receiving and processing the different response signaling message that includes the single-network identifier, and in response to the single-network identifier, routing the call to the affiliated network.

14. The method of claim 9 wherein the called number comprises a toll-free number controlled by the affiliated network.

15. The method of claim 9 wherein the query signaling message and the response signaling message comprise session initiation protocol messages.

16. A communication network comprising:

a network node configured to receive a call set-up signaling message indicating a called number and process the called number to determine that additional routing information is needed, and in response, transfer a query signaling message indicating the called number and an access node identifier;

a call processing system configured to receive the query signaling message and process the called number to determine a single-network identifier associated with the called number and process the single-network identifier to determine if the single-network identifier identifies an affiliated network that is affiliated with the communication network;

if the single-network identifier identifies the affiliated network, then the call processing system is configured to process the access node identifier to determine if the access node identifier identifies a shared access node that is shared by the communication network and the affiliated network;

if the access node identifier identifies the shared access node, then the call processing system is configured to select a double-network identifier indicating both the communication network and the affiliated network, and to transfer a response signaling message that includes the double-network identifier; and the network node is configured to receive and process the response signaling message that includes the double-network identifier, and in response to the double-network identifier, route the call to the shared access node.

17. The communication network of claim 16 wherein, if the single-network identifier does not identify the affiliated network, then the call processing system is configured to transfer a different response signaling message that includes the single-network identifier associated with the called number.

18. The communication network of claim 17 wherein the network node is configured to receive and process the different response signaling message that includes the single-network identifier, and in response to the single-network identifier, route the call to another communication network identified by the single-network identifier.

19. The communication network of claim 16 wherein, if the access node identifier does not identify the shared access node, then the call processing system is configured to transfer a different response signaling message that includes the single-network identifier associated with the called number.

20. The communication network of claim 19 wherein the network node is configured to receive and process the different response signaling message that includes the single-network identifier, and in response to the single-network identifier, route the call to the affiliated network.

\* \* \* \* \*